Aug. 5, 1941.   H. N. RIDER   2,251,422
DRY PIPE VALVE
Filed Feb. 23, 1940   2 Sheets-Sheet 1
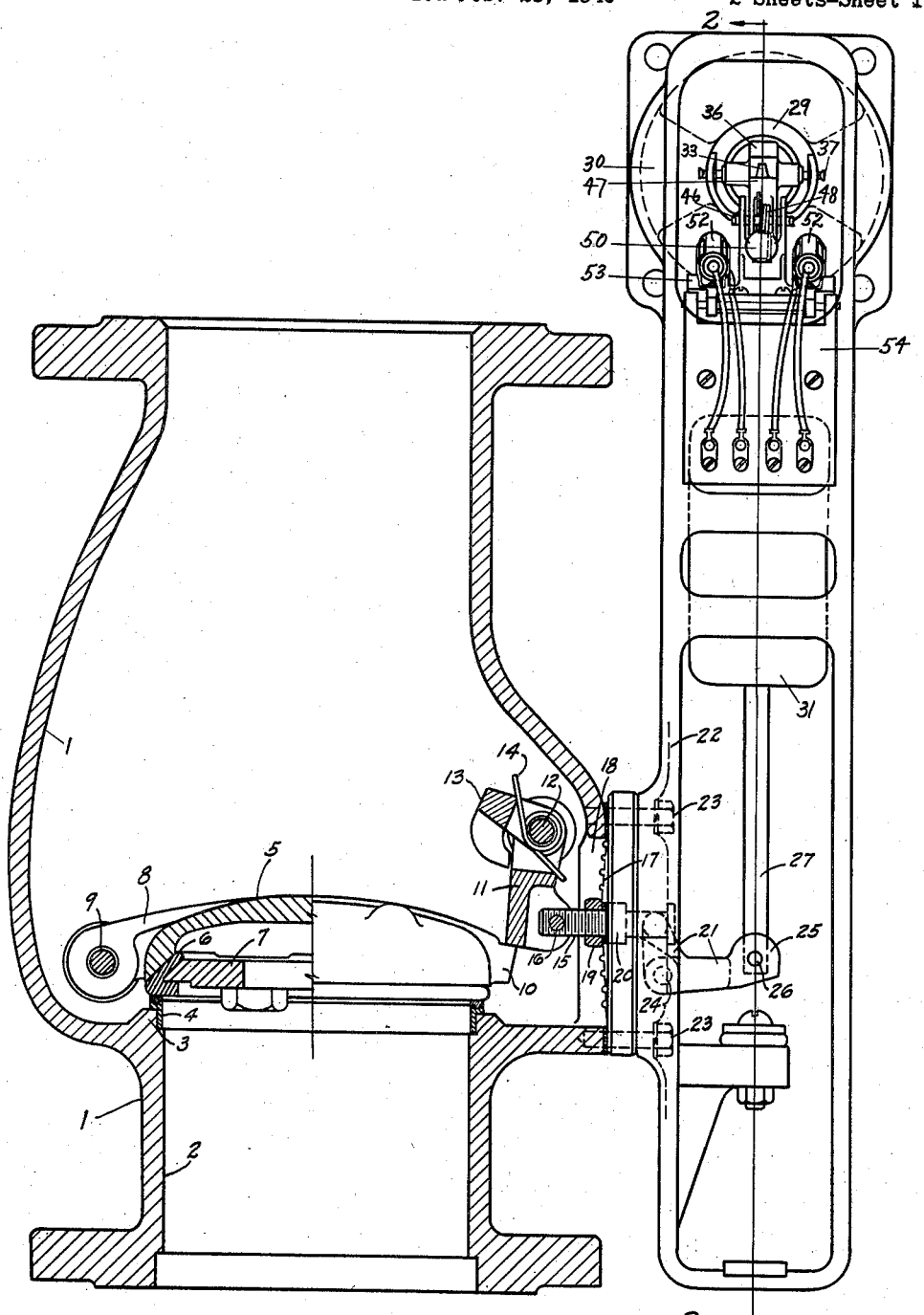
FIG-1-
INVENTOR
HARRY N. RIDER
BY
W. B. Harpman
ATTORNEY.

Aug. 5, 1941.                H. N. RIDER                2,251,422
                            DRY PIPE VALVE
                         Filed Feb. 23, 1940            2 Sheets-Sheet 2
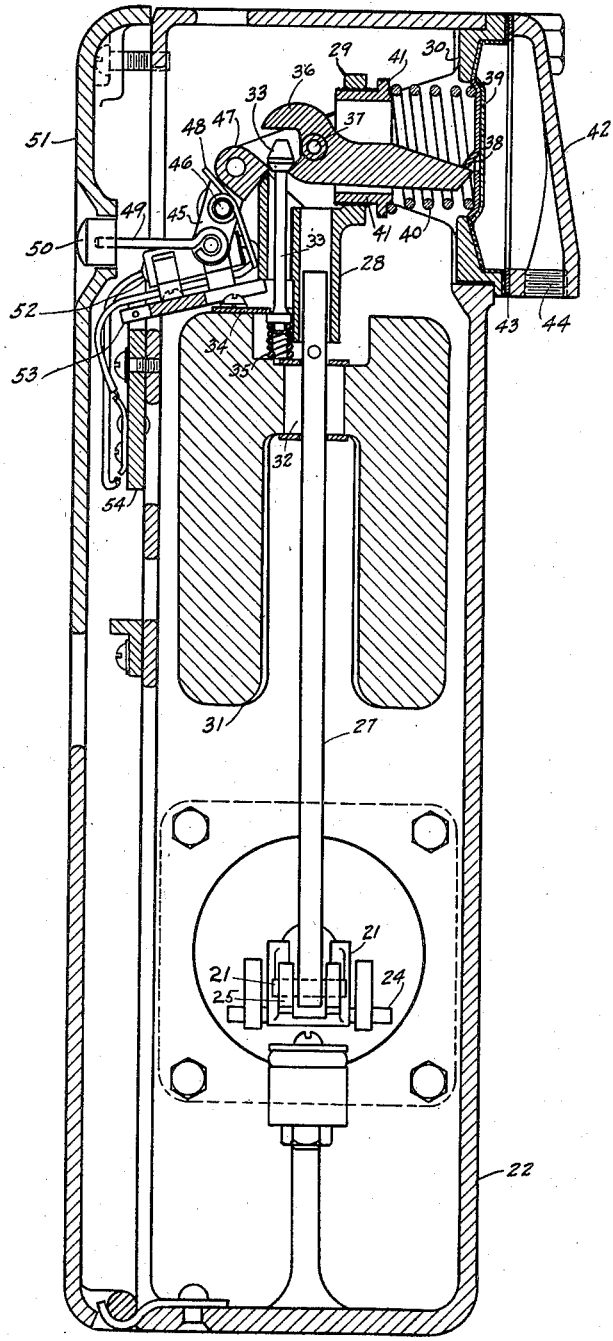
FIG-2-
INVENTOR
HARRY N. RIDER
BY
W. B. Harpman
ATTORNEY.

Patented Aug. 5, 1941

2,251,422

UNITED STATES PATENT OFFICE 2,251,422

DRY PIPE VALVE

Harry N. Rider, Youngstown, Ohio, assignor to "Automatic" Sprinkler Company of America, Youngstown, Ohio, a corporation of Delaware Application February 23, 1940, Serial No. 320,280

7 Claims. (Cl. 169—17)

This invention relates to a dry pipe valve for use with an automatic sprinkler system for the control of fire and particularly to a mechanical type of valve wherein a slight reduction in air pressure in the sprinkler system results in the positive unlatching of the clapper of the valve.

The principal object of this invention is the provision of a dry pipe valve which will operate efficiently with an air pressure carried in the sprinkler system substantially lower than the pressures heretofore carried in dry pipe systems. The valve mechanism is designed so that it will operate upon a drop in pressure which need not exceed a fraction of a pound.

A further object of the invention is the provision of a dry pipe valve for sprinkler systems which responds rapidly to decreases in pressure and eliminates the necessity of employing quick acting devices such as accelerators or exhausters in connection with the system.

A further object of the invention is the provision of a dry pipe valve which will make it possible to maintain a relatively low air pressure in the piping of the sprinkler system which will result in water reaching the sprinklers immediately without the heretofore unavoidable delay occasioned by the necessity of the escape of a considerable volume of air from the piping of the sprinkler system.

A further object of the invention is the provision of a dry pipe valve incorporating electric switches which are actuated in such a manner that an alarm is given in advance of the opening of the dry pipe valve.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed without departing from the spirit of the invention.

The invention is illustrated in the accompanying drawings, wherein:

Figure 1 is a cross sectional elevation of the dry pipe valve and associated operating means.

Figure 2 is a cross sectional side elevation taken approximately on lines 2—2 of Figure 1 and more effectively illustrating the dry pipe valve actuating means. In order to simplify the illustration the dry pipe valve body is not shown in Figure 2.

By referring to the drawings and Figure 1 in particular it will be seen that the dry pipe valve comprises a body 1 in which a water inlet is indicated at 2. In order that the water inlet 2 may be effectively separated from the remainder of the valve body, an annular shoulder 3 provided with a seat ring 4 adapted to receive a clapper 5 serves to effectively control the admission of water into the valve body from the water inlet 2. A suitable rubber facing 6 is affixed to the clapper 5 by means of a clamping ring 7 which in turn is affixed to the clapper 5 by means of a plurality of cap screws.

The clapper 5 is formed with a pair of hinge arms 8 adapted to pivot about a hinge pin 9 so as to effectively hinge the clapper in relation thereto. The hinge pin 9 is carried on suitable bushings positioned in the valve body 1. In order that the clapper 5 will remain in closed position on the water inlet 2 and thus prevent the passage of water through the valve, a latch mechanism is positioned within the valve body and adjacent to a shoulder 10 formed on the clapper 5. The latch mechanism comprises a latch 11 pivoted to the valve body by means of a latch hinge pin 12 so that horizontal movement imparted to the lower end of the latch 11 results in moving it from its seat on the shoulder 10 of the clapper 5 thus effectively releasing the clapper 5 and permitting water in the water inlet 2 to raise the clapper 5 and flow through the valve. Still referring to the latch mechanism it will be seen that the latch 11 has an anti-reseating portion 13 pivoted thereto and adapted to prevent the clapper 5 from reseating. In order that the anti-reseating latch 13 will remain in effective operating position, a latch spring 14 is utilized which serves to position the anti-reseating latch portion 13 in operative relation to the clapper 5 at all times.

In order that movement may be imparted to this latch 11, so as to result in the opening of the clapper 5, a latch link 15 is pivoted at its innermost end to the latch 11 by means of a link pin 16. This latch link 15 passes centrally through and is affixed to a circular latch link diaphragm 17 which is positioned in a water tight manner across an opening 18 in the side of the valve body 1 and thus permits the transmittal of movement through the latch link 15 while effectively closing the opening 18 in the valve body 1. The latch link 15 passes through an opening in the diaphragm 17 and is affixed therein in a water tight manner by means of a nut 19 threaded thereon so as to oppose an annular shoulder 20 formed on the latch link 15. A portion of the latch link extends outwardly from the annular shoulder 20 and comprises in effect a T headed connection adapted to receive in a movable manner a latch arm 21 which is part of a valve actuating mechanism which comprises a vertically positioned actuating mechanism box 22 bolted by means of bolts 23 to the valve body 1 at a point thereon adjacent the opening 18 thereof so that its mechanism effectively imparts movement to the latch link 15.

The latch arm 21 is pivoted by means of a hinge pin 24 to the box 22 and is adapted to impart movement to the latch link 15. In order that the latch arm 21 may receive movement suitable for actuating the latch link 15, in turn, the latch 11, an end 25 thereof is pivoted by means of a pin 26 to the lowermost end of a vertically positioned guide rod 27.

By referring to Figure 2 of the drawings it will be seen that the uppermost end of this guide rod 27 is slidably positioned within a sleeve 28 which is in turn carried upon a portion 29 of a release frame 30. A pin is positioned through the guide rod 27 so as to limit the upward movement thereof which might otherwise interfere with the action of the releasing mechanism. A weight 31 having a centrally positioned opening 32 therein is positioned on the rod 27 so as to be slidable vertically thereof. In order that the weight 31 may be maintained in elevated position as shown in the drawings, a barbed shaft 33 is affixed thereto in a flexible manner by means of a retaining plate 34 and a coil spring 35. The barbed shaft 33 is retained in position by means of a barb latch 36 pivoted to a bracket on the portion 29 of the release frame 30 by means of a pin 37. The opposite end of the barb latch 36 tapers to a point adapted to be retained beneath a ledge 38 formed on a disk affixed to a diaphragm 39 which is in turn positioned on and over an opening formed by the release frame 30. A coil spring 40 is positioned between the inner side of the diaphragm 39 and an adjacent section 41 of the release frame 30 so that the coil spring 40 tends to move the diaphragm 39 outwardly so as to release the pointed end of the barb latch from beneath the ledge 38 of the disk positioned thereon. By referring to Figure 2 it will be seen that the section 41 referred to is tubular in shape and threadably positioned within a threaded opening in the portion 29 of the release frame 30. In order that an air pressure chamber may be formed adjacent the diaphragm 39, a diaphragm cap 42 is bolted to the release frame 30 and the box 22 adjacent the diaphragm 39. A gasket 43 is positioned between the diaphragm cap and the release frame 30 to insure a tight joint and the diaphragm cap 42 is provided with a threaded opening 44 adapted to receive a tubular connection communicating with either the piping of the sprinkler system or the valve body 1 so that the pressure chamber formed adjacent the diaphragm 39 will receive and retain air under pressure equal to that in the valve body and sprinkler system.

In operation the air under pressure in the piping of the sprinkler system will be released upon the opening of any given sprinkler thus resulting in a rapid decrease of air pressure within the diaphragm cap 42. This decrease in air pressure results in the coil spring 40 moving the diaphragm 39 outwardly into the area within the diaphragm cap and thus releases the barb latch 36 from beneath the ledge 38 of the diaphragm. When this occurs the barbed shaft 33 and the weight 31 drops downwardly along the guide rod 27 and the weight 31 strikes the end 25 of the arm 21 thus effectively moving the same. This action moves the latch link 15 outwardly together with the latch 11 which results in the unlatching of the clapper 5.

In order that the low pressure drive pipe valve may be operated manually if desired, as for example, at such times as a fire is observed in its early stages, mechanism has been incorporated to permit the manual release of the weight 31 which will effectively cause the dry pipe valve to be unlatched and permit the sprinkler system to be filled with water. By referring to Figure 2 wherein this mechanism is illustrated more clearly, it will be seen that a manual release arm 45 is pivoted to a bracket formed on a portion 29 of the release frame 30 by means of a pin 46 and that its upper end forms an operating lever 47 shaped to fit under an edge of the barb on the barbed shaft 33 in opposite relation to the barb latch 36. A tension spring 48 positioned about the pin 46 serves to hold the manual release arm and operating lever 47 in position. By referring to the lower end of the arm 45 it will be seen that a rod 49 is attached thereto by suitable pivot means and carries on its outermost end a push button 50 which is slidably positioned within an opening in a cover portion 51 of the actuating mechanism box 22. It will be seen that by pushing the push button 50 inwardly the arm 45 turns or pivots upon the pin 46 and effectively releases the operating lever 47 from beneath the barbed shaft 33 thus effectively permitting the weight to drop and actuate the valve.

Still referring to Figure 2 it will be seen that electric switches are incorporated with the valve releasing mechanism and comprises a pair of mercury switches 52 positioned in suitable clamps on a tiltable base 53 which is pivoted at its outermost end to a terminal block 54. It will be seen that as long as the weight 31 is in its uppermost position as shown in the drawings, the base 53 carrying the mercury switches 52 will remain tilted and effectively keep the switches open and that when the weight 31 drops the base 53 will follow that movement a relatively short distance thus effectively closing the circuit through the mercury switches which tilt into closed position. It will be obvious that any other type of electric switch may be utilized so as to be operative at such times as the weight 31 is released by the valve operating mechanism. Thus an electrical alarm may be given prior to the actual opening of the dry pipe valve which is of considerable value in the event that the water supply to the dry pipe valve has been interrupted.

It will thus be seen that a dry pipe valve and actuating mechanism has been designed which has certain inherent advantages not heretofore known to the art, one of the principal ones of which is its ability to operate positively with remarkably low air pressure in the piping of the sprinkler system and to open the dry pipe valve upon a reduction of this low air pressure by only a fraction of a pound. This permits a relatively simple and inexpensive compressor to be used in place of the expensive electric air compressors heretofore necessary to maintain relatively high pressure in the piping of the sprinkler system. Another advantage resulting through the use of extremely low air pressure in the piping of the sprinkler system is in that the air when put into the system will not be of high temperature and therefore the condensation of the air in the piping will be much less than has heretofore been the case which will tend to eliminate broken pipes caused by freezing of the condensate in cold weather. Another advantage resulting from the low air pressure carried in the piping of the sprinkler system is that the fanning of the fire with compressed air escaping from sprinklers is eliminated as the relatively small quantity of air in the piping of the sprinkler system escapes rapidly and permits the water to reach the sprinklers quicker than heretofore. It will also be seen that the tripping mechanism of the dry pipe valve can be tested at frequent intervals without filling the piping of the sprinkler system with water, as the operating mechanisms, except for one latch, are external parts and further that the priming of this valve occurs when the service supply comes in contact with the under side of the clapper 5, and that there are no external pipe connections for priming purposes. It will be seen that the dry pipe valve and actuating mechanism shown and described herein can be reset within a relatively short time as there is no need of rebuilding high air pressure in the piping of the sprinkler system. This is an important advantage in connection with the maintenance and testing of the sprinkler system. It will also be seen that this dry pipe valve may be effectively used in connection with hose valves for protecting cold areas that are not sprinklered, as the opening of the hose valve will immediately drop the air pressure in the standpipe or other piping which will very quickly operate this dry pipe valve and thus permit the flow of water to the hose valves.

What I claim is:

1. The combination of a dry pipe valve and actuating mechanism therefor, the said valve comprising a body having a clapper hinged therein adapted to close a water inlet therein, latch means for maintaining the clapper in closed position, said latch means controlled by the said actuating mechanism comprising a weight actuated lever connected with the said latch means, the said weight slidably positioned upon a guide rod connected to the said lever, secondary latch means for suspending the weight above the lever, said secondary latch means comprising an air pressure chamber, a diaphragm forming one wall thereof, a ledge formed on said diaphragm on the opposite side thereof from the said air pressure chamber, and adapted to receive a beveled end portion of a pivoted latch arm thereinunder so that a slight reduction of air pressure adjacent the said diaphragm results in the movement of the diaphragm into the air pressure chamber by the action of the beveled end portion of the pivoted latch arm thereagainst so as to release the said secondary latch means and the weight suspended thereby so that the drop of the said weight will move the said lever and release the said clapper latch means.

2. The combination of a dry pipe valve and actuating mechanism therefor, the said valve comprising a body having a clapper hinged therein adapted to close a water inlet therein, latch means for normally maintaining the clapper in closed position, said latch means controlled by the said actuating mechanism comprising a weight actuated lever arm connected with the said latch means, a water tight diaphragm positioned between the said latch means and the said lever arm through which a portion of the said latch means passes, a weight slidably positioned upon a guide rod pivoted to the said lever arm, means for suspending the weight above the lever arm, said means comprising a barbed shaft movably affixed to the said weight and a pivoted barb latch positioned adjacent the said barbed shaft so as to normally support the said weight thereby, a diaphragm positioned on a supporting frame between a coil spring and an air pressure chamber and adjacent an end of the said barb latch, a ledge formed on the diaphragm for normally holding the barb latch in latched position so that slight reduction of air pressure in the air pressure chamber permits the coil spring to move the diaphragm and disengage the end of the barb latch therefrom so as to effectively release the weight.

3. Mechanism adapted to unlatch a clapper of a dry pipe valve in a sprinkler system upon a reduction of air pressure in the piping of the said sprinkler system and comprising a weight operated lever positioned in operative relation to a clapper latch of the said dry pipe valve, and including structural means for suspending a weight above the said lever and means for dropping the said weight upon a reduction of air pressure in the piping of the sprinkler system, said weight dropping means comprising an air pressure chamber formed in the said mechanism and in communication with the said piping of the sprinkler system, a portion of the said air pressure chamber comprising a flexible air tight diaphragm, a shoulder formed on the said diaphragm on the opposite side thereof from the said air pressure chamber and adapted to control a weight releasing latch normally in association therewith, spring means positioned adjacent the said weight releasing latch so as to move the said diaphragm into the said air pressure chamber upon a slight reduction of air pressure therein, the said spring means opposed in an adjustable manner by a structural portion of the said mechanism.

4. Mechanism adapted to unlatch a clapper of a dry pipe valve in a sprinkler system upon a reduction of air pressure in the piping of the said sprinkler system and comprising a weight operated lever positioned in operative relation to a clapper latch of the said dry pipe valve, and including structural means for suspending a weight above the said lever and means for dropping the said weight upon a reduction of air pressure in the piping of the sprinkler system, said weight dropping means comprising an air pressure chamber formed in the said mechanism and in communication with the said piping of the sprinkler system, a portion of the said air pressure chamber comprising a flexible air tight diaphragm, a shoulder formed on the said diaphragm on the opposite side thereof from the said air pressure chamber and adapted to control a weight releasing latch normally in association therewith, means positioned adjacent the said weight releasing latch normally urging the said diaphragm into the said air pressure chamber upon a slight reduction of air pressure therein, the said means opposed in an adjustable manner by a structural portion of the said mechanism.

5. The combination of a dry pipe valve and actuating mechanism therefor, the said valve comprising a body having a clapper hinged therein adapted to close a water inlet therein, latch means for normally maintaining the clapper in closed position, said latch means controlled by the said actuating mechanism comprising a weight actuated lever arm connected with the said latch means, a water tight diaphragm positioned between the said latch means and the said lever arm through which a portion of the said latch means passes, a weight slidably positioned upon a guide rod pivoted to the said lever arm, means for suspending the weight above the lever arm, said means comprising an air pressure chamber, a diaphragm forming one wall thereof, a ledge formed on said diaphragm on the opposite side thereof from the said air pressure chamber, and adapted to receive a beveled end portion of a pivoted latch arm thereinunder so that a slight reduction of air pressure adjacent the said diaphragm results in the movement of the diaphragm into the air pressure chamber by the action of the beveled end portion of the pivoted latch arm thereagainst so as to release the said secondary latch means and the weight suspended thereby so that the drop of the said weight will move the said lever and release the said clapper latch means.

6. Mechanism adapted to unlatch a clapper of a dry pipe valve in a sprinkler system upon a reduction of air pressure in the piping of the said sprinkler system and comprising a weight operated lever positioned in operative relation to a clapper latch of the said dry pipe valve, and including structural means for suspending a weight above the said lever and means for dropping the said weight upon a reduction of air pressure in the piping of the sprinkler system, said weight dropping means comprising an air pressure chamber formed in the said mechanism and in communication with the said piping of the sprinkler system, a portion of the said air pressure chamber comprising a flexible air tight diaphragm, a ledge formed on the said diaphragm on the opposite side thereof from the said air pressure chamber and adapted to control a weight suspending member normally in association therewith, means positioned adjacent the said weight suspending member normally urging the said diaphragm into the said air pressure chamber upon a slight reduction of air pressure therein, the said means opposed by a structural portion of the said mechanism.

7. In a dry pipe system having a dry pipe valve including a valve element, a retaining means for said valve element comprising a latch and means positioned exteriorly of the said dry pipe valve for actuating the latch, and a water tight flexible diaphragm positioned between the said latch and the said actuating means, the said actuating means including a weight, and means for suspending the weight in operative relation to the said latch, said weight suspending means including a secondary diaphragm exposed at one side to air pressure within the dry pipe system and adapted to retain said weight in suspended relation to the said latch by said pressure, means for moving the said secondary diaphragm to a weight releasing position when the said pressure is reduced so as to permit the weight to actuate the latch and release the said valve element.

HARRY N. RIDER.